(12) United States Patent
Chen

(10) Patent No.: US 8,760,439 B2
(45) Date of Patent: Jun. 24, 2014

(54) PHOTOELECTRIC BLACKBOARD PEN

(75) Inventor: Po-Chou Chen, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 134 days.

(21) Appl. No.: 13/495,015

(22) Filed: Jun. 13, 2012

(65) Prior Publication Data

US 2013/0257823 A1    Oct. 3, 2013

(30) Foreign Application Priority Data

Apr. 2, 2012  (TW) .............................. 101111729 A

(51) Int. Cl.
    *G09G 3/22*    (2006.01)
(52) U.S. Cl.
    USPC ........................................................ 345/183
(58) Field of Classification Search
    USPC ................................................ 345/179–183
    See application file for complete search history.

(56) References Cited

U.S. PATENT DOCUMENTS

| | | | |
|---|---|---|---|
| 4,833,697 A * | 5/1989 | Perna et al. ..................... 377/15 |
| 6,300,580 B1 * | 10/2001 | Shenholz et al. .......... 178/19.02 |
| 6,567,076 B2 * | 5/2003 | Yeh ................................. 345/180 |
| 6,914,596 B2 * | 7/2005 | Liu et al. ....................... 345/179 |
| 7,239,302 B2 * | 7/2007 | Kim ............................... 345/165 |
| 7,657,128 B2 * | 2/2010 | Silverbrook et al. .......... 382/313 |
| 2005/0093837 A1 * | 5/2005 | Singer ........................... 345/179 |

* cited by examiner

*Primary Examiner* — Kevin M Nguyen
(74) *Attorney, Agent, or Firm* — Novak Druce Connolly Bove + Quigg LLP

(57) ABSTRACT

A photoelectric blackboard pen includes a pen tube, a photoelectric element, a spring, and a spherical lens. The pen tube includes an upper portion and a lower portion away from the upper portion. The lower portion defines a circular through hole. The photoelectric element is positioned on an internal sidewall of the upper portion. The diameter of the spherical lens is slightly larger than that of the through hole. The spherical lens is rotatably positioned in the through hole and partially passes through the through hole. One end of the spring is positioned on the internal sidewall of the upper portion. The diameter of the spherical lens is slightly larger than that of the spring, the other end of the spring sleeves around and resists against the spherical lens.

8 Claims, 2 Drawing Sheets

PHOTOELECTRIC BLACKBOARD PEN

BACKGROUND

1. Technical Field

The present disclosure relates to pens and, particularly, to a photoelectric blackboard pen.

2. Description of Related Art

A photoelectric blackboard is a single pixel two-dimensional array. Each single one pixel includes a red ting diode (LED), a blue LED, a green LED and a photo-detector sensor. When a red, a blue or a green photoelectric blackboard pen touches the photoelectric blackboard, the photo-detector sensor senses a pressure force applied by the photoelectric blackboard pen and detects which color light the photoelectric blackboard pen is emitting, then drives the pixel to emit the same color light as emitted by the photoelectric blackboard p n. For example, when the red LED photoelectric blackboard pen touches the photoelectric blackboard the photo-detector sensor senses the pressure force applied by the photoelectric blackboard pen and deter the photoelectric blackboard pen emitting red light, then drives the pixel to emit red light too. However, at present, a nib of the photoelectric blackboard pen nib is flat and without concentrate ability, this carries the risks of the sensitivity of the photo-detector sensor becoming poor, and then not be able to write smoothly.

Therefore, it is desirable to provide a photoelectric blackboard pen, which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
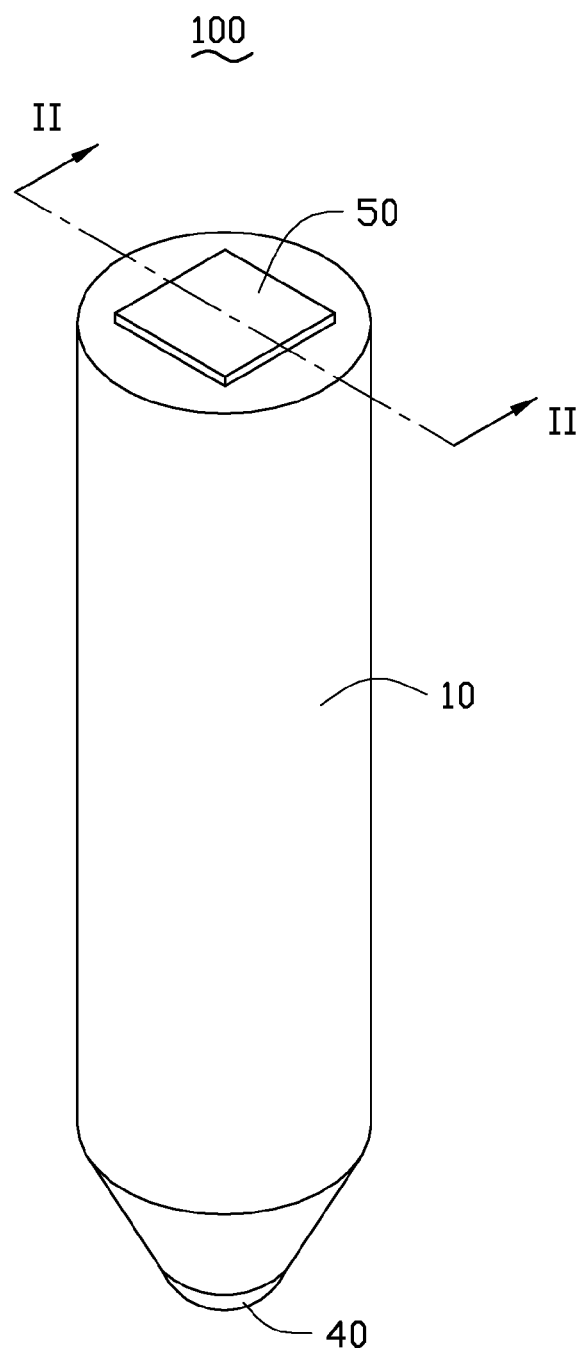
FIG. 1 is an assembled, isometric view of a photoelectric blackboard pen, according to an embodiment.
Figure 2:
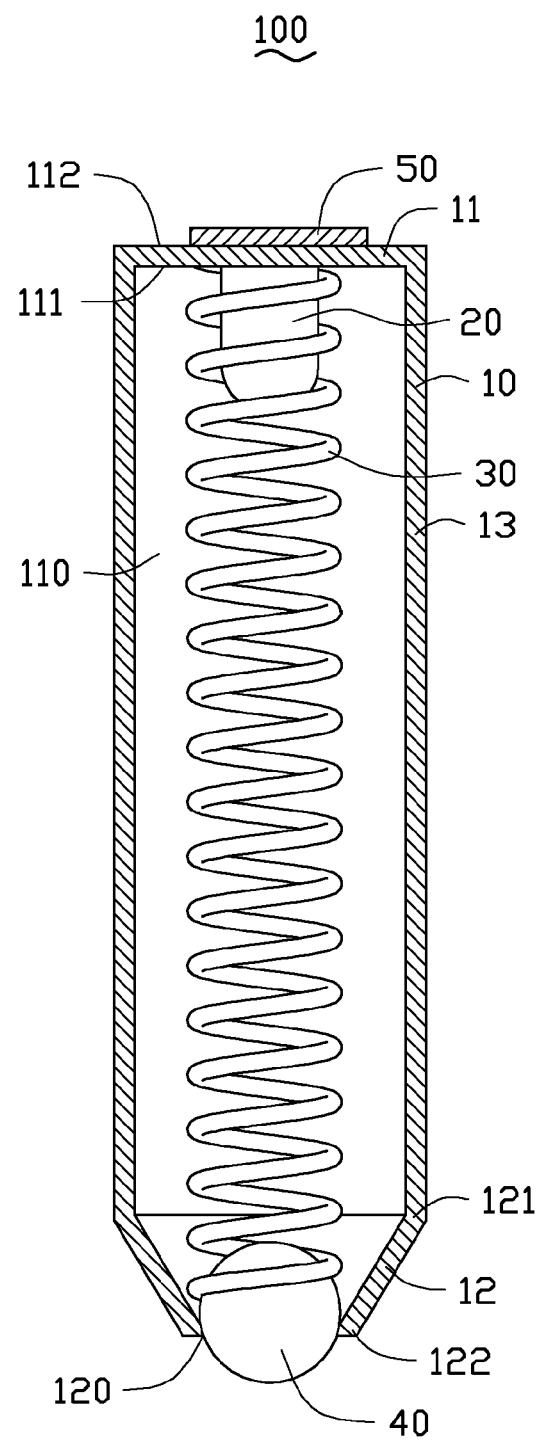
FIG. 2 is a cross-sectional view taken along line II-II of FIG. 1.

FIGS. 1-2, illustrate a photoelectric blackboard pen 100 according to an exemplary embodiment, for writing on a photoelectric blackboard. The photoelectric blackboard pen 100 includes a pen tube 10, a photoelectric element 20, a spring 30, a spherical lens 40, and a power supply 50.

The pen tube 10 includes an upper portion 11, a lower portion 12 away from the upper portion 11, and a sidewall 13. The sidewall 13 is substantially perpendicular to and connected to both the upper portion 11 and the lower portion 12. The upper portion 11, the lower portion 12, and the sidewall 13 cooperatively form a receiving room 110 for receiving the photoelectric element 20, the spring 30, and the spherical lens 40.

The upper portion 11 includes an internal sidewall 111 and an external sidewall 112 facing away from the internal sidewall 111. The lower portion 12 is conical and includes a first end 121 connected with the sidewall 13 and a second end 122 away from the sidewall 13. A diameter of the lower portion 12 gradually decreases from the first end 121 towards the second end 122. The lower portion 12 defines a through hole 120 at a center of the second end 122. Both the through hole 120 and the receiving room 110 are concentric with each other. In the embodiment, the through hole 120 is circular. Alternatively, the shape of the through hole 120 also can be other shapes, such as square.

The photoelectric element 20 is a light-emitting diode (LED) and is positioned on the internal sidewall 111 of the upper portion 11. In the embodiment, the photoelectric element 20 is a red LED. Alternatively, the photoelectric element 20 can also be a blue LED or a green LED.

The length of the spring 30 is larger than that of the sidewall 13 of the pen tube 10. One end of the spring 30 is positioned on the internal sidewall 111 of the upper portion 11. The photoelectric element 20 is sleeved around by the spring 30.

The diameter of the spherical lens 40 is slightly larger than that of the through hole 120 and also slightly larger than that of the spring 30. The spherical lens 40 is rotatably positioned in the through hole 120 and partly passes through the through hole 120. The other end of the spring 30 sleeves around and resists against the spherical lens 40.

In the embodiment, the power supply 50 is a solar panel and is positioned on the external sidewall 112 of the upper portion 11 of the pen tube 10. The power supply 50 is electrically connected to the photoelectric element 20 through a wire (not shown) to provide power supply to the photoelectric element 20.

In use, because of the photoelectric blackboard pen 100 uses the spherical lens 40, which has a function of concentrate ability. Therefore, when the photoelectric blackboard pen 100 writes on a photoelectric board (not shown), the sensitivity of the photo-detector sensor of the photoelectric board can be improved. In addition, when the photoelectric blackboard pen 100 writes on the photoelectric board, the spherical lens 40 is rotated on the photoelectric blackboard, as such, writing is smooth.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric blackboard pen, comprising:
   a pen tube comprising an upper portion and a lower portion away from the upper portion, the upper portion comprising an internal sidewall, the lower portion defining a circular through hole;
   a photoelectric element positioned on the internal sidewall of the upper portion;
   a spherical lens, a diameter of the spherical lens being slightly larger than a diameter of the through hole, the spherical lens rotatably positioned in the through hole and partially passing through the through hole; and
   a spring, one end of the spring positioned on the internal sidewall of the upper portion, the diameter of the spherical lens being slightly larger than a diameter of the spring, the other end of the spring sleeving around and resisting against the spherical lens.

2. The photoelectric blackboard pen of claim 1, wherein the pen tube further comprises a sidewall substantially perpendicular to and connected to both the upper portion and the lower portion, all of the upper portion, the lower portion, and the sidewall cooperatively define a receiving room, the receiving room receives the photoelectric element, the spring, and the spherical lens.

3. The photoelectric blackboard pen of claim 2, wherein a length of the spring is larger than a length of the sidewall of the pen tube.

4. The photoelectric blackboard pen of claim 2, wherein the upper portion comprises an external sidewall facing away from the internal sidewall, the lower portion is conical and comprises a first end connected with the sidewall of the pen tube and a second end away from the sidewall of the pen tube, a diameter of the lower portion gradually decreases from the first end towards the second end, the lower portion defines the through hole at a center of the second end.

5. The photoelectric blackboard pen of claim 4, wherein both the through hole and the receiving room are concentric with other.

6. The photoelectric blackboard pen of claim 4, wherein the photoelectric blackboard pen further comprises a power supply, the power supply is electrically connected to the photoelectric element.

7. The photoelectric blackboard pen of claim 6, wherein the power supply is a solar panel and is positioned on the external sidewall of the upper portion of the pen tube.

8. The photoelectric blackboard pen of claim 1, wherein the photoelectric element is a light-emitting diode.

\* \* \* \* \*